US010708357B2

(12) United States Patent
Hendel et al.

(10) Patent No.: US 10,708,357 B2
(45) Date of Patent: Jul. 7, 2020

(54) NETWORK-DISPLACED DIRECT STORAGE

(71) Applicant: AVAGO TECHNOLOGIES INTERNATIONAL SALES PTE. LIMITED

(72) Inventors: Ariel Hendel, Cupertino, CA (US); Karagada Ramarao Kishore, Saratoga, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 203 days.

(21) Appl. No.: 15/941,910

(22) Filed: Mar. 30, 2018

(65) Prior Publication Data
US 2018/0227365 A1 Aug. 9, 2018

Related U.S. Application Data

(62) Division of application No. 14/248,751, filed on Apr. 9, 2014, now Pat. No. 9,967,340.

(60) Provisional application No. 61/810,965, filed on Apr. 11, 2013.

(51) Int. Cl.
H04L 29/08 (2006.01)

(52) U.S. Cl.
CPC .................. H04L 67/1097 (2013.01)

(58) Field of Classification Search
CPC ... H04L 67/1097; H04L 49/901; H04L 69/08; G06F 3/0683; G06F 15/17331; G06F 3/0659
See application file for complete search history.

(56) References Cited

U.S. PATENT DOCUMENTS

| | | | |
|---|---|---|---|
| 7,500,047 B1 * | 3/2009 | Tyndall | H04L 69/08 710/105 |
| 7,668,923 B2 * | 2/2010 | Herring | H04L 12/00 709/209 |
| 9,317,521 B1 | 4/2016 | Bent | |
| 2004/0120332 A1 * | 6/2004 | Hendel | H04L 47/521 370/411 |
| 2007/0088768 A1 | 4/2007 | Passerini | |
| 2008/0109573 A1 * | 5/2008 | Leonard | G06F 13/28 710/24 |
| 2009/0222569 A1 * | 9/2009 | Frick | G06F 16/10 709/230 |
| 2010/0146068 A1 * | 6/2010 | Haviv | G06F 3/0613 709/212 |
| 2010/0183024 A1 | 7/2010 | Gupta | |
| 2010/0281201 A1 * | 11/2010 | O'Brien | G06F 13/4027 710/308 |
| 2013/0179879 A1 | 7/2013 | Zhang | |

(Continued)

Primary Examiner — Ario Etienne
Assistant Examiner — Kidest Mendaye
(74) Attorney, Agent, or Firm — Xsensus LLP

(57) ABSTRACT

A network-displaced direct storage architecture transports storage commands over a network interface. In one implementation, the architecture maps, at hosts, block storage commands to remote direct memory access operations (e.g., over converged Ethernet). The mapped operations are communicated across the network to a network storage appliance. At the network storage appliance, network termination receives the mapped commands, extracts the operation and data, and passes the operation and data to a storage device that implements the operation on a memory.

17 Claims, 9 Drawing Sheets

(56) References Cited

U.S. PATENT DOCUMENTS

2013/0198312 A1* 8/2013 Tamir .................... G06F 15/167
709/212
2013/0339600 A1* 12/2013 Shah ....................... G06F 3/067
711/114
2014/0283115 A1   9/2014 Ben-Natan

* cited by examiner

NETWORK-DISPLACED DIRECT STORAGE

CROSS-REFERENCE TO RELATED APPLICATIONS

This application is a Divisional of and is based upon and claims the benefit of priority under 35 U.S.C. § 120 for U.S. Ser. No. 14/248,751, filed Apr. 9, 2014, which is based on and claims priority to provisional application Ser. No. 61/810,965, filed Apr. 11, 2013, both which are incorporated by reference in its entirety.

BACKGROUND OF THE INVENTION

Field of the Invention

This disclosure relates to networking. This disclosure also relates to a network-displaced direct storage architecture.

Description of the Related Art

High speed data networks form part of the backbone of what has become indispensable worldwide data connectivity. Within the data networks, many different types of network devices such as switches, routers, and bridges direct data packets from source devices to destination devices located virtually anywhere around the world. Improvements in network performance will drive further advances in high speed data networks.

DETAILED DESCRIPTION OF THE PREFERRED EMBODIMENTS

The disclosure below concerns techniques and architectures for implementing network-displaced direct storage (NDDS). In some implementations, a host device, such as a rack-mount server, web-server, computer, laptop, smartphone, tablet, or other device implementing storage functions, may send storage commands to network storage appliance circuitry (NSAC) via a network connection. For example, a NDDS layer (or other computing element) may be inserted into a stack, e.g., for a kernel, a protocol, or other stack, to receive storage commands for NDDS. The NDDS layer may map the commands to a network protocol functions and forward the mapped commands to the protocol stack for transfer to the NSAC over a network. Applications running on the host may access storage through a virtual file system (VFS) that may map storage commands to various storage mediums associated with the host. The storage mediums may include direct storage (DS), e.g., direct attached storage (DAS), on-board hard-drives, flash memory, disk drives, NDDS, or other DS, network attached storage (NAS), cloud storage, or other types of storage. In various implementations, storage commands directed to NDDS virtual file spaces in the VFS may be received by the NDDS layer and transferred to an NSAC over the network.

In some implementations, a DS device may exchange blocks, e.g. data blocks, which may represent a file if a file system is provided for the drive. Blocks may be exchanged in the absence of the file system. To support a DS device, a host need not process the blocks into a file system for transport. To support a NAS device, blocks may be processed into network files in a network file system. In some cases, NAS support may increase the number of processing layers used in a system so that block storage operations may be translated into network file operations.

Figure 1:
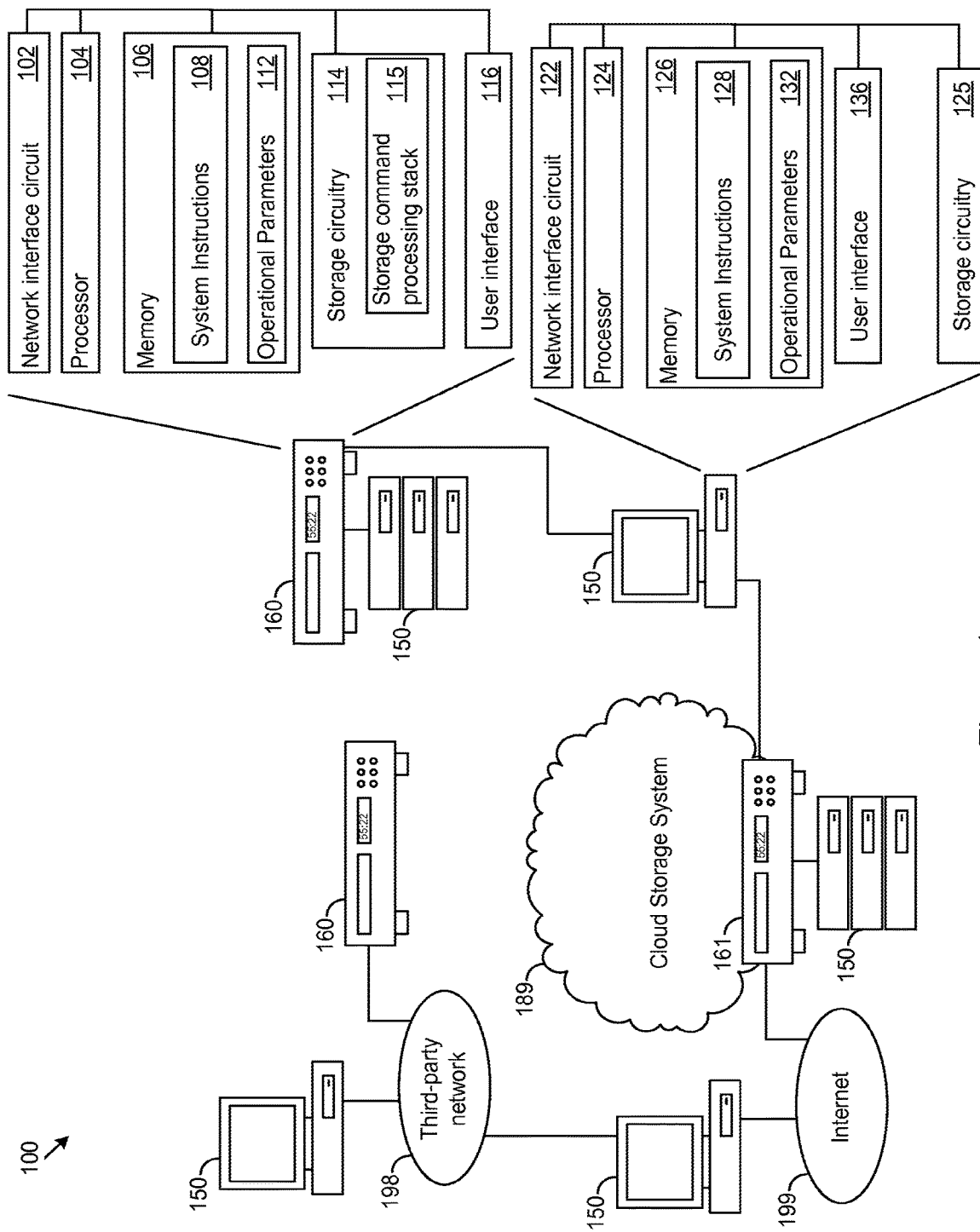
FIG. 1 shows an example network environment.

The example environment described below provides an example context for explaining the techniques and architectures for implementing NDDS. FIG. 1 shows an example environment in which a network 100 connects different types of devices. Hosts 150, such as servers, and/or other devices, may be interconnected over the network 100. The hosts 150 may implement storage commands and/or operations, some of which may be forwarded to NSACs 160 via the network 100. In some cases, the network 100 may send communications over the internet 199 and/or third party networks 198 to forward communications from a host to a NSAC 160 at a remote location. For example, an NSAC 161 may manage a cloud storage system 189.

Circuitry included in the NSAC 160 may include a network interface circuit 102 to support network communications over one or more protocols, and one or more processors 104 to support execution of received storage operations, routing operations, and to govern operation of the NSAC 160. The NSAC 160 may include memory 106 for execution support and storage of system instructions 108 and operational parameters 112. The NSAC 160 may include a user interface 116 to allow for user configuration and operation of the NSAC 160. The NSAC 160 may further include storage circuitry 114 to support reception and processing of storage commands from the hosts 150. The storage circuitry 114 may run a storage command processing stack 115 to for execution of the received storage commands. For example, the storage command processing stack may provide storage protocol termination, e.g., remote direct memory access (RDMA) over converged ethernet (RoCE), non-volatile memory express (NVME), small computer storage interface (SCSI), or other storage protocol.

For RDMA operations, establishment of a connection to the remote host, as well as appropriate permissions, may be established using a Queue Pair (QP) which may include a completion queue, a send queue and a receive queue. In some implementations, the send queue and receive queue may transport data, and the completion queue may transport control messages, e.g., messages indicating completions and/or other control message. The queue pair may be initialized on both sides of the connection. With a QP established, functions in an API, sometimes referred to as 'verbs' may be used to perform RDMA reads, RDMA writes, atomic operations, serialized send/receive operations, and other types of operations. In various implementations, RoCE may be implemented to carry RDMA commands over an ethernet fabric to a remote host.

The hosts 150 may include servers, terminals, and/or other computing devices. Circuitry included in the hosts 150 may include a network interface circuit 122 to support network communications over one or more protocols, and one or more processors 124 to support execution of applications and operating systems, and to govern operation of the host 150. The host 150 may include memory 126 for execution support and storage of system instructions 128 and operational parameters 132. The host 150 may include a user interface 136 to allow for user operation of the host. The hosts 150 may include storage circuitry 125 to interface with NSAC via the network 100.

In various implementations, the NSAC 160 may be disposed as a top-of-rack (TOR) device. The NSAC 160 may support host servers disposed on the rack for which the NSAC is a TOR device. In some cases, a NSAC may provide direct storage for tens or hundreds of hosts or other numbers of hosts. The NSACs may be implemented in data centers to allow for disaggregation of server processing components and storage devices. In some cases, modular replacement of components may be facilitated by this disaggregation. Storage components need not be stored in the same box as other computing components. Separate housing may allow for the disparate parts to be replaced independently. Additionally or alternatively, storage upgrades may be implemented on multiple hosts at one time by upgrading an NSAC used by the multiple hosts.

Figure 2:
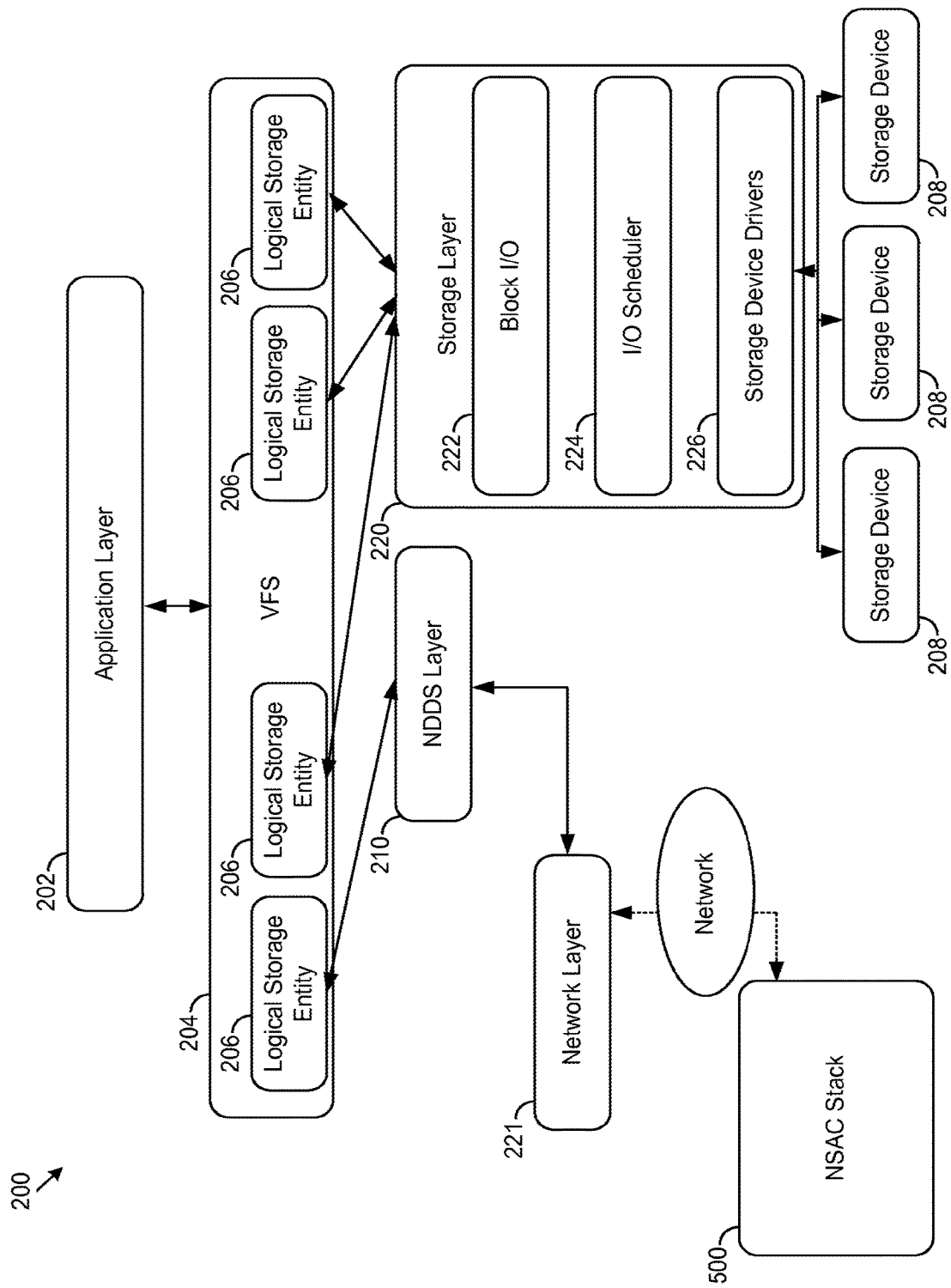
FIG. 2 shows an example stack architecture.

FIG. 2 shows an example stack architecture 200. In various implementations, the example stack architecture 200 may execute on the one or more processors 104 and/or the storage circuitry 125 disposed on the host 150. The stack architecture 200 may include an application layer 202 which may produce storage operations for a VFS 204. The storage operations may include, for example, storage operations such as reads, writes, puts, gets, deletes, and/or other operations may be generated by the application layer. The storage operations may be designated for logical storage entities 206 within the VFS 204. The logical storage entities 206 may be associated with storage devices. For example, ones of the logical storage entities may be mapped to one or more storage devices 208. The storage devices may in include DAS, NAS, NDDS, or other storage mediums. A NDDS layer 210 may map storage operations for one or more logical storage entities to storage commands for a NDDS system. In some implementations, the NDDS layer 210 may map the storage commands to a network protocol, e.g., the NDDS layer may format and/or encapsulate the commands for RoCE transmission. Additionally or alternatively, the formatting and encapsulation may occur all or in part at the network layer 221

The NDDS layer may forward the mapped storage commands to a network layer 221. The network layer 221 may send the commands over a network connection to a NSAC stack 500. Storage operations, including storage operations not associated with the NDDS system, may be passed from the VFS to a storage layer 220 in the in the stack architecture 200. The storage layer may include block command input/output (I/O) 222, an I/O scheduler 224, and may pass mapped storage commands to device drivers 226 for execution of the storage commands on associated storage devices. The block command I/O may map the storage operations of the VFS 204 to storage commands for the storage layer 220. The I/O scheduler may sequence and direct storage commands to their target device drivers 226. The device drivers may interact with a storage interface circuitry 230 to execute the storage commands on a storage device. For example, the storage interface circuitry may include a peripheral component interconnect (PCI) interface, PCI express (PCIe) interface, SCSI, or other storage interface circuitry.

The NDDS layer 210 may bypass the storage layer 220 in the stack architecture 200. For example, the NDDS layer 210 may accept storage operations directly from the VFS 204. The NDDS layer 210 then may translate the storage operations into network protocol storage commands and pass the commands to the network layer 221.

Figure 3:
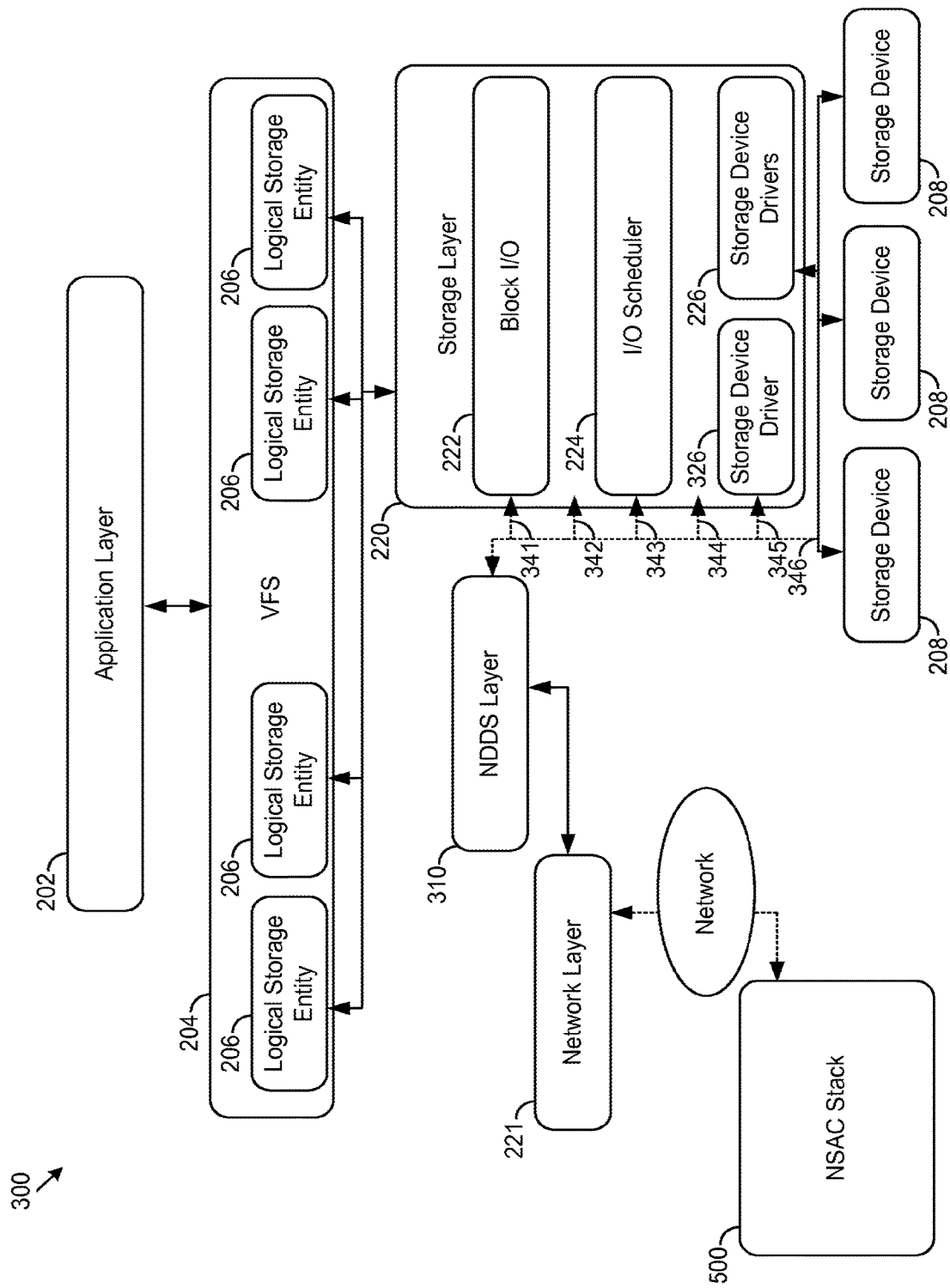
FIG. 3 shows an example stack architecture.

FIG. 3 shows an example stack architecture 300. In the example stack architecture, the NDDS layer 310 accepts storage commands from the storage layer 220. In various implementations, the NDDS layer may receive the storage commands at different points within the storage layer 220. In some cases, the NDDS layer 310 may access the storage commands after the block command I/O 222. In some cases, the NDDS layer may access storage commands from the I/O scheduler 224. In some cases, the NDDS layer may be associated with a device driver 326 and may receive storage commands when after the commands are passed to the associated driver 326 from the I/O scheduler. In various implementations, the NDDS layer may intercept storage commands at an interception point within the storage layer 220, such as one or more of the interception points 341-346. The interception points may be located at specific functional blocks, e.g., the interception point 341 is located at the block command I/O 222, while the interception point 342 is located after the block command I/O 222.

Figure 4:
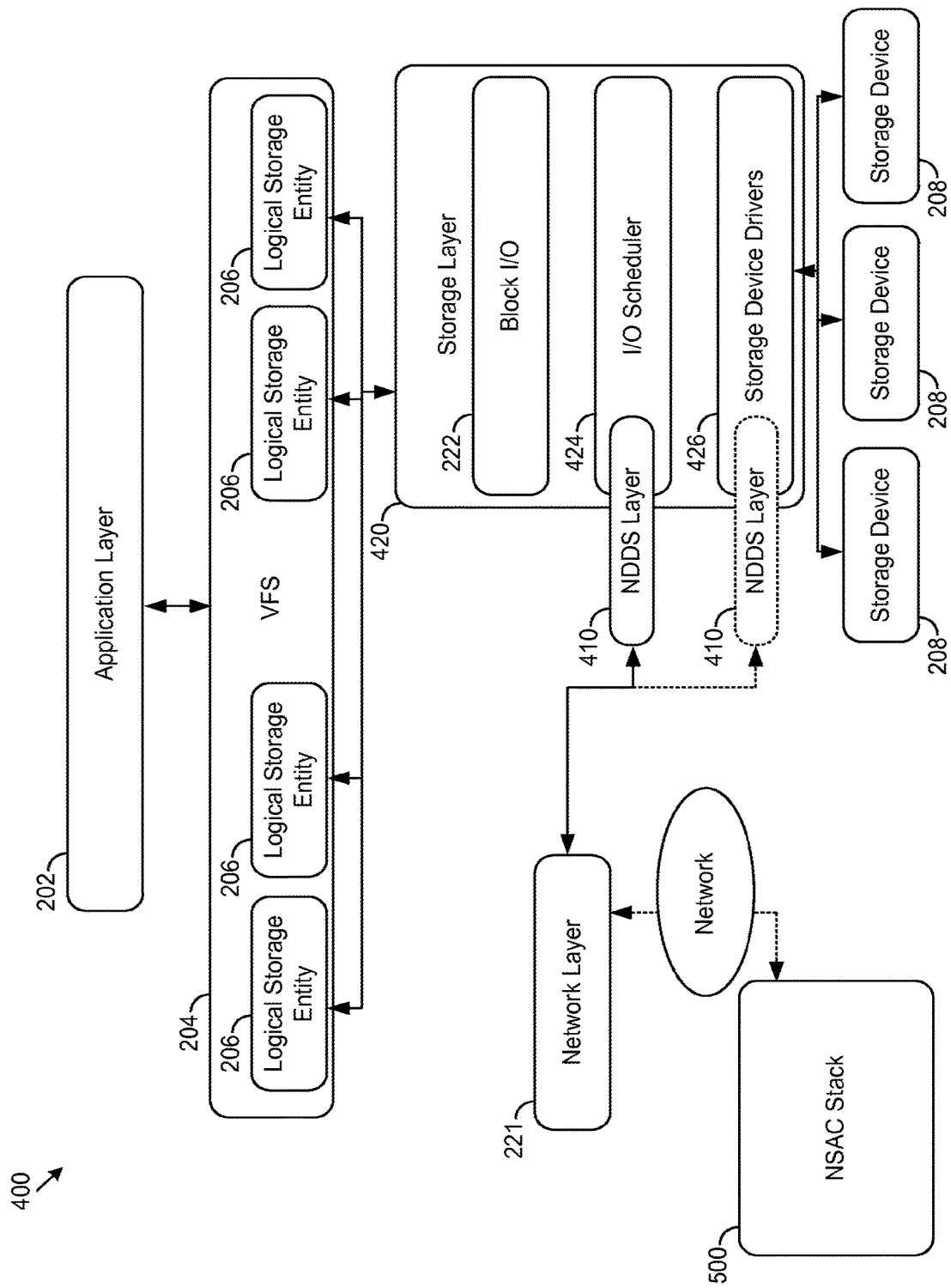
FIG. 4 shows an example stack architecture.

FIG. 4 shows an example stack architecture 400. In the example stack architecture, the NDDS layer 410 may be integrated into the storage layer 420. The NDDS layer 410 may process storage commands to determine if the commands may be passed to the network layer 221. For example, the NDDS layer may be integrated, fully or in part, with a I/O scheduler 424 in the storage layer 420. Commands directed to the NDDS system may then be directed to the network layer 221 via I/O processing. In another example, the NDDS layer may be integrated with a device driver 426 within the storage layer. Formatting and passage to the network layer may be executed through the functions of the driver 426.

In various implementations, the example stack architectures 200, 300, 400 may be implemented in a host running a Linux operating system. The stack architectures 200, 300, 400 may be implemented to forward block I/O commands destined for/or at a block device interface in the storage stack of the Linux kernel a ethernet protocol stack of the Linux kernel.

Figure 5:
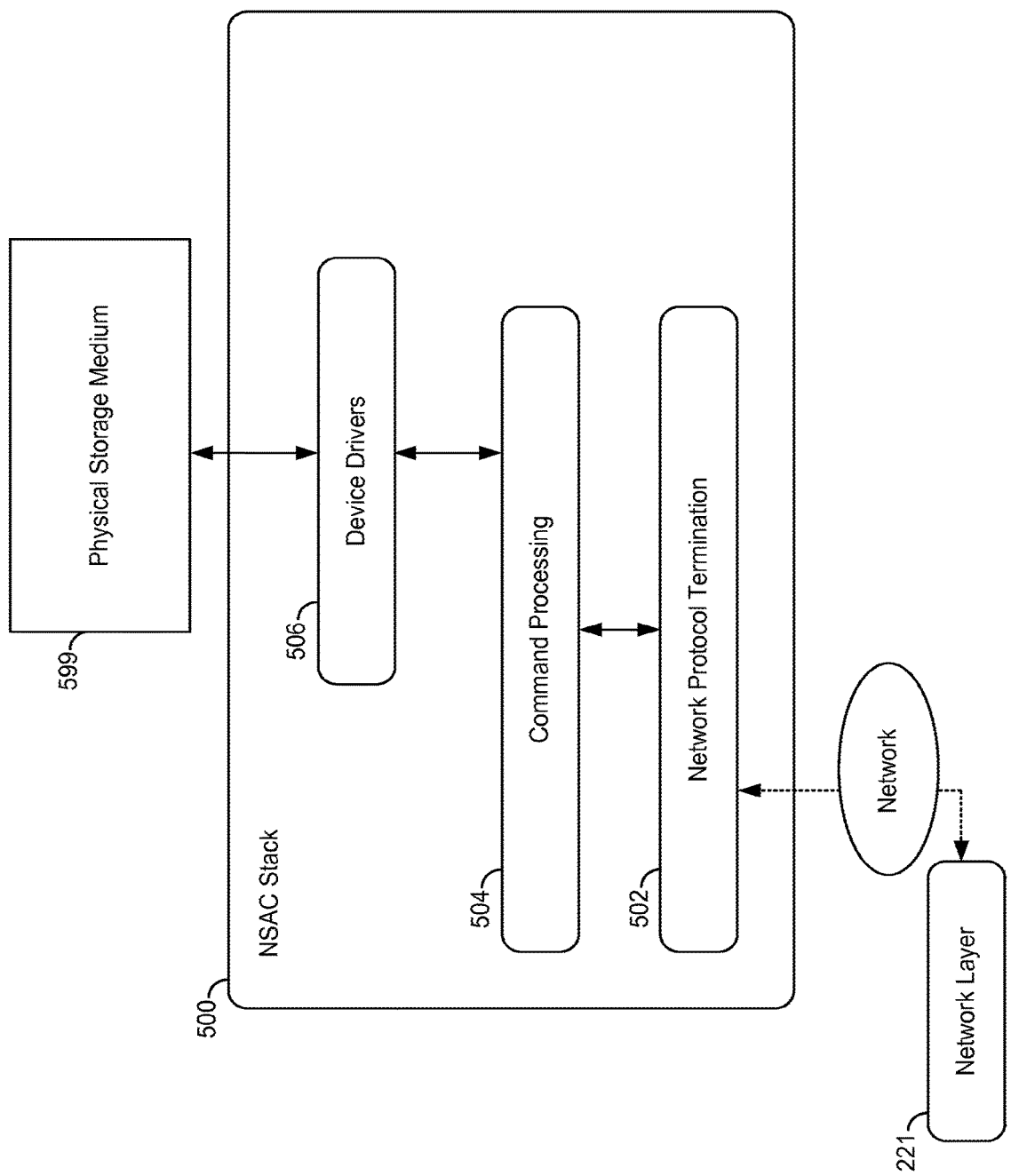
FIG. 5 shows an example network storage appliance circuitry (NSAC) stack.

FIG. 5 shows an example NSAC stack 500. In various implementations, the example NSAC stack may execute on the processors 104 and/or storage circuitry 114 of a NSAC 160. In the example, the NSAC stack 500 may include network protocol termination 502 for communications received from the network layer 221 of host stack architecture, e.g., 200, 300, 400. For example, the NSAC stack 500 may include a layer for de-encapsulation of commands received from a host over the network. The layer may de-encapsulate commands from ethernet transport packets. Additionally or alternatively, the layer may de-map commands from transport protocols, such as RoCE, to allow for block command recovery. In some cases, the layer may include a RoCE termination layer for processing RoCE compliant communications.

Additionally or alternatively, The NSAC stack 500 may further include command processing 504 for various storage command protocols. For example, the de-encapsulated commands may be compliant with NVME, SCSI, or other storage protocols. The command processing 504 may read the de-encapsulated commands for translation into storage operations for execution on a storage interface.

The NSAC stack 500 may then pass the storage operations to device drivers 506. The device drivers then execute the storage operations on a physical storage medium 599, e.g., through a storage device specific control interface. For example, an NSAC 160 may include flash memory, e.g., a solid state drive. The NSAC stack 500 may receive commands over the network 100 from a host 150. The NSAC stack 500 may terminate, de-encapsulate, and process the received commands to extract storage operations. For example, to support the flash memory bank an NVME memory model may be implemented. After NVME processing, the NSAC stack 500 may pass the storage operations to a flash memory controller on the NSAC 160. The flash memory controller may execute the storage commands on the flash memory bank.

In response to execution of one or more storage operations, the NSAC stack 500 may send a response communication to the host stack architecture 200, 300, 400. The response communication may acknowledge successful/unsuccessful completion of a storage operation, carry requested data, or other storage response. In various implementations, the response may be processed, encapsulated, and transmitted over the network 100 such that the response is received at the host stack architecture 200, 300, 400 at the NDDS layer 210, 310, 410 and passed through the host stack architecture so that it may be treated similarly to a response communication from a DAS device by the application layer 202, VFS 204, and/or other layers outside the NDDS layer 210, 310, 410.

Figure 6:
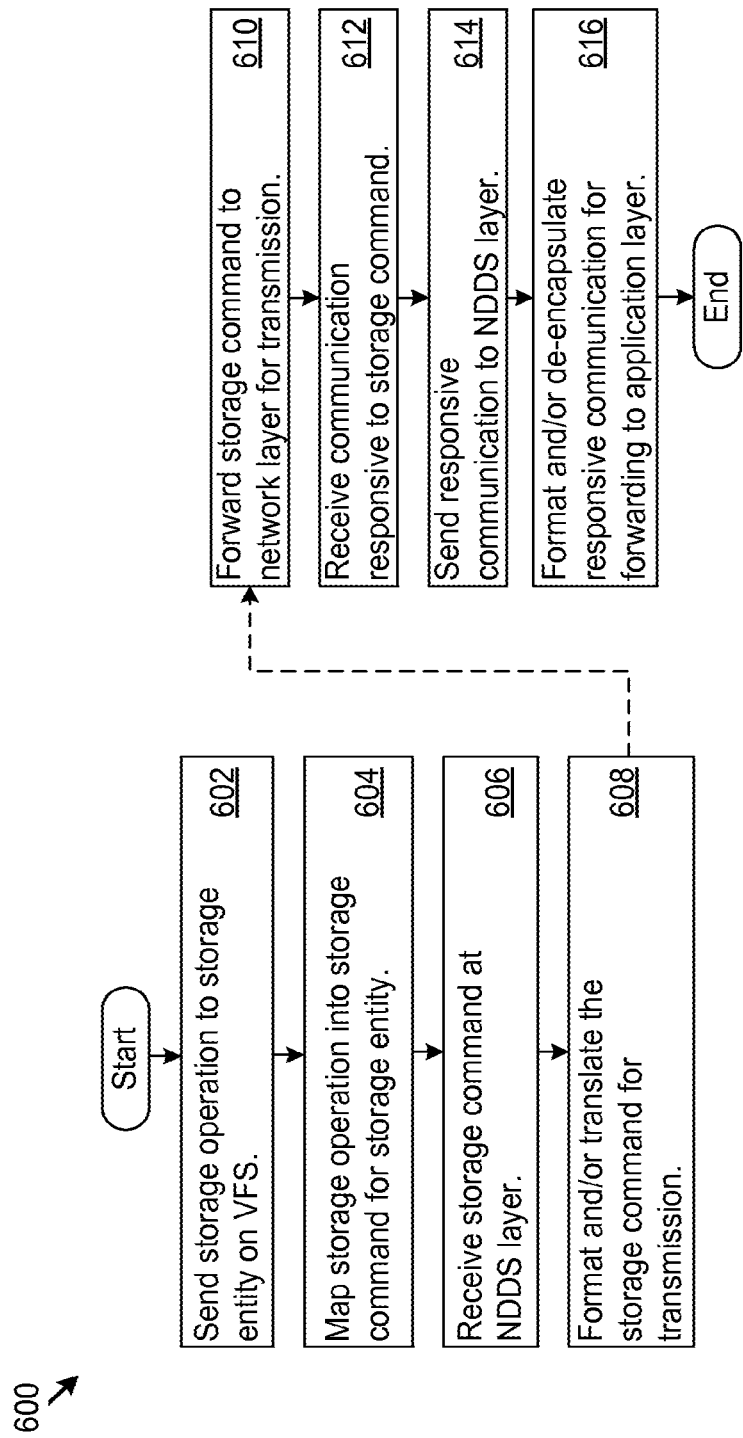
FIG. 6 shows example circuitry for network-displaced direct storage (NDDS) operation.

FIG. 6 shows example circuitry 600 for NDDS operation. An application layer within a stack may send a storage operation to a storage entity on a virtual file system (602). The VFS may map the storage operation into a storage command for the storage entity (604). The storage entity may be associated with a NDDS system. The storage command may be received by a NDDS layer (606). The NDDS layer may format and/or translate the storage command for transmission over a network connection (608). The NDDS layer may forward the storage command to a network layer for transmission to an NSAC over the network connection (610). The network layer may receive one or more communications from the NSAC responsive to the storage command (612). The network layer may send the responsive communication to the NDDS layer (614). The NDDS layer may format and/or de-encapsulate the responsive communications for forwarding to the application layer via the VFS (616).

Figure 7:
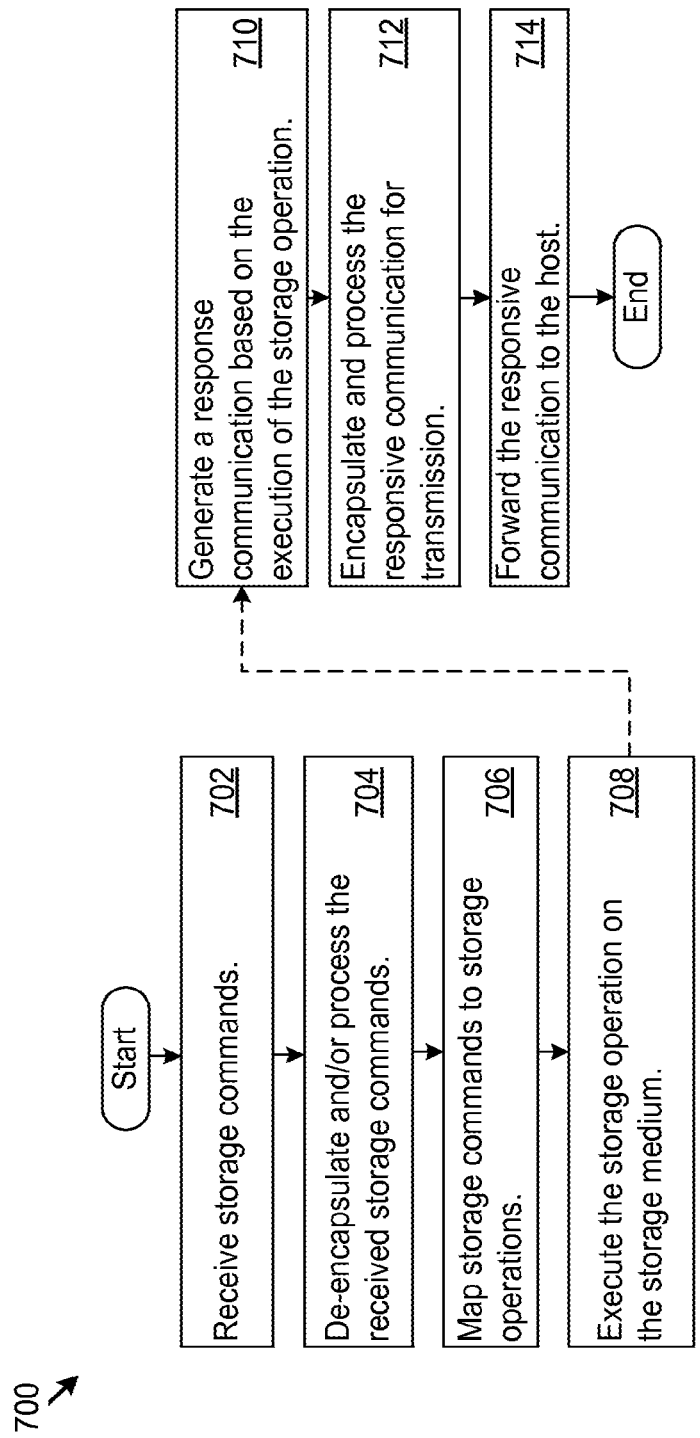
FIG. 7 shows example circuitry for NSAC operation.

FIG. 7 shows example circuitry 700 for NSAC operation. A NSAC may receive storage commands from a host at a network port (702). The NSAC may de-encapsulate and/or process the received storage commands (704). The NSAC may map the storage commands to one or more storage operations for a storage medium at the NSAC (706). The NSAC may execute the storage operation on the storage medium (708). The NSAC may generate a response communication based on the execution of the storage operation (710). The NSAC may encapsulate and process the responsive communication for transmission via a network connection (712). The NSAC may forward the responsive communication to the host via the network (714). The responsive communication may travel back to the application layer of the host from which the received storage command originated. The responsive communication may travel back via the network layer and NDDS layer in the host. For example, a host may send a read command to the NSAC. The NSAC may respond with the requested data from the read command. The requested data may then be sent the application layer as if the application layer were reading from a DAS device.

Figure 8:
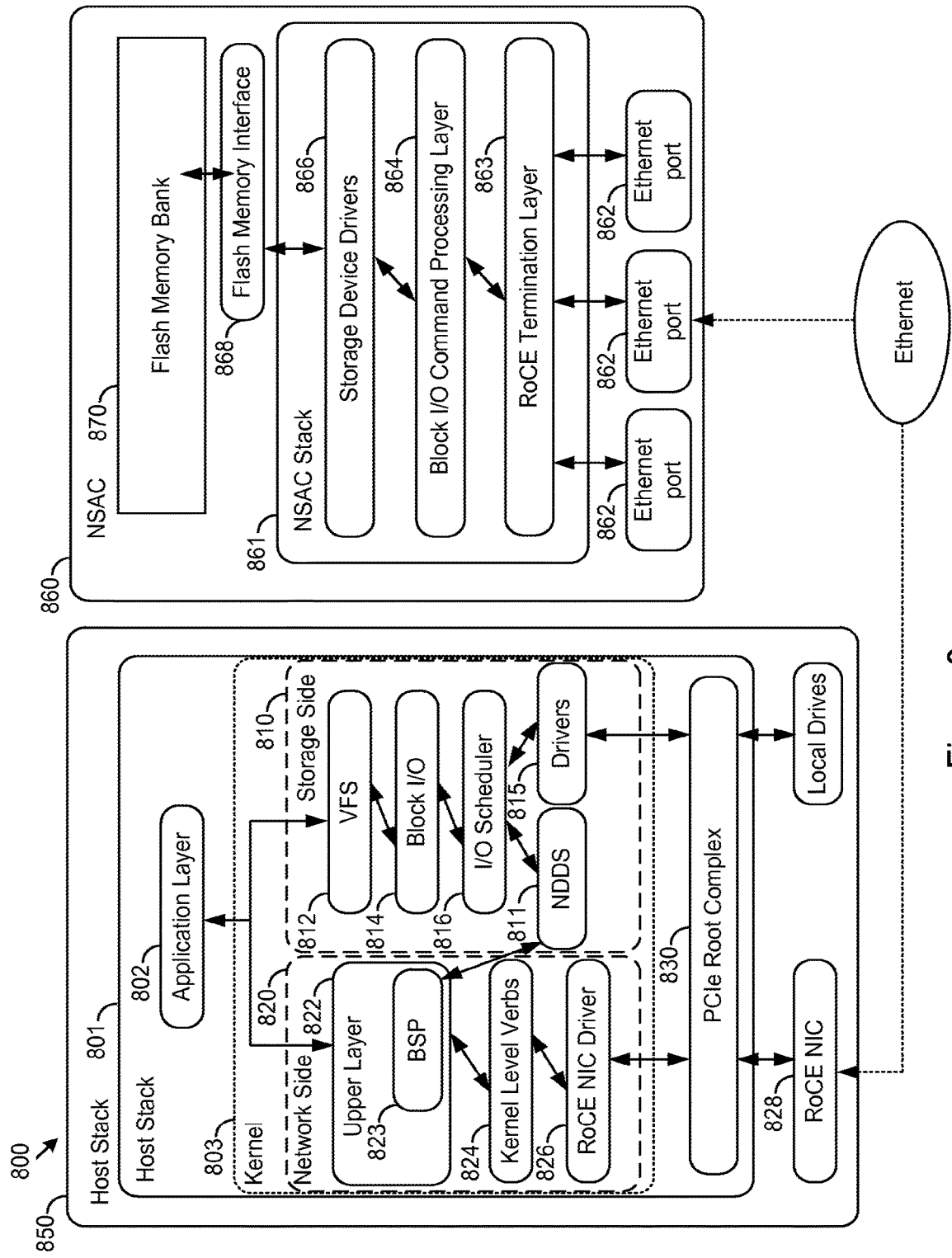
FIG. 8 shows an example network environment for NDDS.

FIG. 8 shows an example network environment 800 for NDDS. In the example environment 800, a stack 801 is executed on a host 850. The stack includes an application layer 802 and a kernel 803 with a network side 820 and a storage side 810. The storage side 810 may receive storage operations from the application layer 802. The storage side may include a VFS 812, block I/O 814, and an I/O scheduler 816. The I/O scheduler may send storage commands (based on the storage operations from the application layer 802) to device drivers and/or the NDDS layer 811. Other storage operations may be mapped by the VFS 812 to commands for local storage devices. The commands for local storage device may be sent to specific device drivers 815 and then sent to local drives via the PCIe root complex 830 on the host 850. The NDDS layer 811 may map the storage commands it receives to a RoCE command structure and forward the mapped commands to a block storage protocol (BSP) 823 running in the upper layers 822 of the network side 820 of the kernel 803. The commands may be translated into kernel level verbs 824 and received by a RoCE network interface card (NIC) driver 826. The RoCE NIC driver may communicate with the RoCE NIC 828 via the PCIe root complex 830. The RoCE NIC may forward the commands to an ethernet port 862 of a NSAC 860 running an NSAC stack 861. The NSAC stack 861 may include a RoCE termination layer 863, a block I/O command processing layer 864, and storage device drivers 866. The storage device drivers 866 may communicate with a flash memory interface 868 to execute storage operation on a flash memory bank 870. The RoCE termination layer 863 may de-encapsulate the RoCE commands and map the de-encapsulated commands to block storage commands. The block I/O command processing layer 864 may map the block storage commands to storage operations for the storage device drivers, which may execute the storage operations on the flash memory bank 870.

The storage device driver 866 may generate a responsive communication which may be sent back to the application layer 802 of the host 850 via the NSAC stack 861, the network, block storage protocols of the network side 820, and the storage side 810 of the host stack 801 via the NDDS layer 811. For example, the NDDS operation circuitry 600 and/or the NSAC operation circuitry 700 may be implemented to execute the two-way storage communications.

Figure 9:
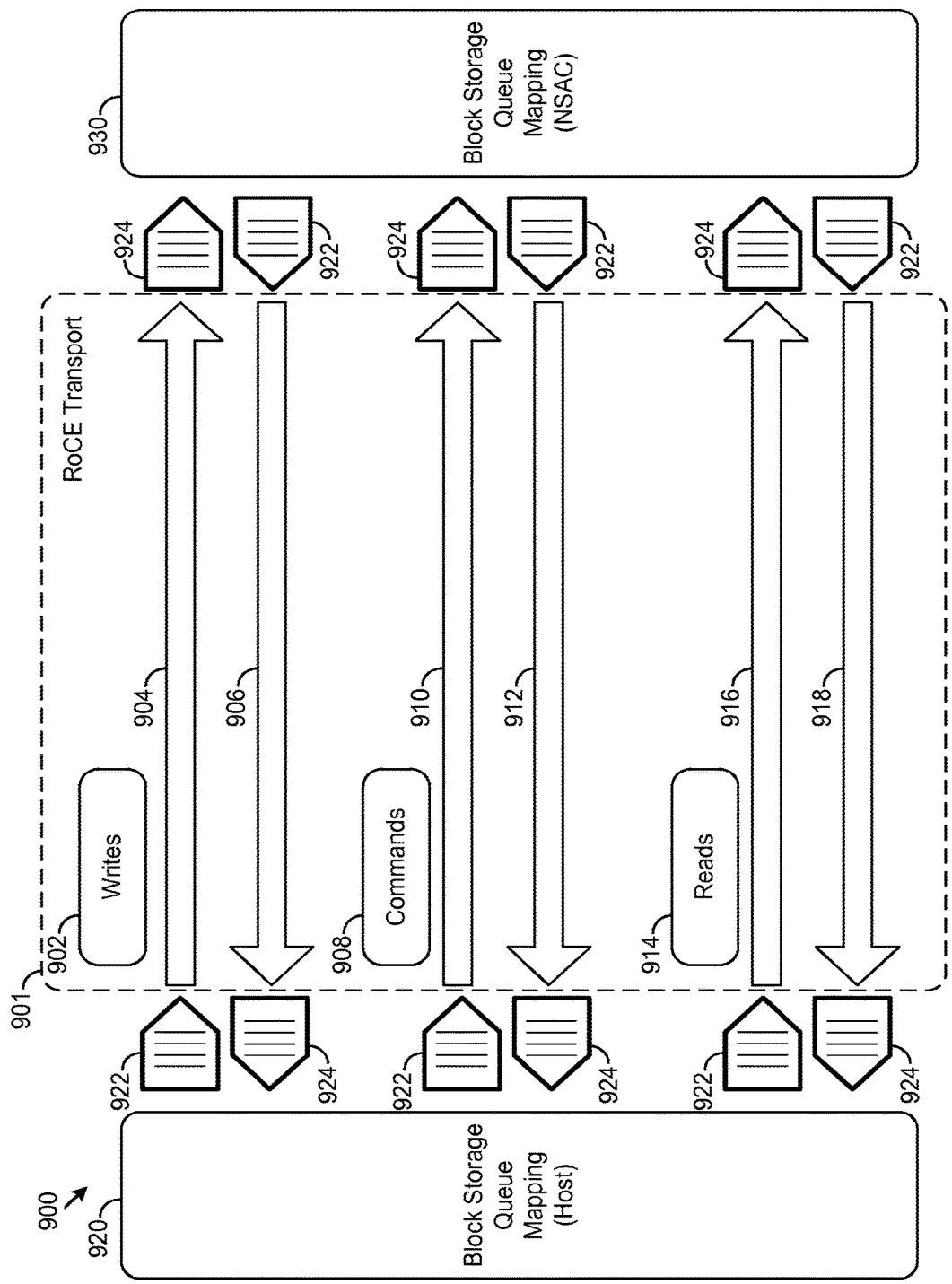
FIG. 9 shows an example mapping from block storage commands to remote direct memory access over converged ethernet.

FIG. 9 shows an example mapping 900 from block storage commands to RoCE. Block storage commands may be mapped to RoCE commands at block I/O to RoCE mapping queues 922. RoCE commands may be mapped to block storage commands at RoCE to block I/O mapping queues 924. Once mapped to RoCE, commands may be transported over network connections 901, e.g., Ethernet network connections. The mapping 900 shows examples of writes 902, e.g., data pushes 904 and write completions 906. Data pushes 904 may be mapped to RoCE 'SEND' work queues. In some implementations, the command, data, and/or metadata for a block storage command may be sent in the same work queue. Write completions 906 may responsively use the same queue pairs as write commands in the reverse direction. The RoCE work queue may be implemented to perform synchronous writes, target retries and/or other write command types. The mapping 900 also shows examples of commands 908, including command pushes 910, and resulting command completion codes 912. Block storage command pushes 910 may be translated to the RoCE SEND work queues. Command completion 912 codes may be sent responsively using the same queue pair as the initiating command push 910. The mapping 900 also shows examples of reads 914, including read requests 916 and resultant read data 918. Read requests 916 may be mapped to RoCE SEND work queues. Read data pushes 918 may be sent using RoCE SEND work queues in the reverse direction.

In some implementations, a NSAC may implement an object storage system. In some cases, the file structure may be hidden and application layer commands from the host may be directed to an application programming interface (API) designed to support the object storage deployment used in the NSAC. Object storage may be performed using data identifiers for the API and unstructured data for bulk storage. For an object, which may have an arbitrary size, e.g., a movie, music file, program data, or other data object, the data identifier may be stored along with file in an unstructured form, e.g., without a file hierarchy. The data identifier may be used to locate the unstructured data corresponding to the object through the API. For example, in a cloud-based NSAC, the file structure within the NSAC may be hidden. In a cloud system with one or more mirrored storage locations, access to a specific mirror by a host may be disallowed. In some cases, a host may make a request for a storage operation related to a particular data object. The request may include a data identifier. The resource locator may be used to locate the data object on one of multiple storage locations, e.g., multiple mirrors. In various implementations, an API for the object storage deployment may run within the host stack. The commands from the API may be mapped to a transport protocol over a network for NDDS support of object storage. For example, the API commands may be mapped to RoCE. In some implementations a stack architecture 200 in which the NDDS layer bypasses the storage layer may be implemented to support object storage. At the NSAC, the received commands may be RoCE terminated and processed through an API processing layer to translate the commands back into a form supporting object storage on the NSAC.

In some implementations, object storage over ethernet may be performed using NSACs with Seagate Kinetic drives or other drives supporting object storage. Additionally or alternatively, an OpenStack, Swift, Ceph, or other object storage infrastructure may be used.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

The invention claimed is:

1. A device, comprising:
a memory; and
network storage circuitry coupled to the memory, the network storage circuitry comprising a network interface, the network storage circuitry configured to:
map a block command data PUSH to a remote direct memory access over converged ethernet (RoCE) SEND work queue;
send a read PUSH via the RoCE SEND work queue;
receive a mapped block storage command at the network interface;
based on a mapping between an RoCE protocol and a block storage command set, determine a primary block storage command from the mapped block storage command;
process the primary block storage command to determine a memory operation;
execute the memory operation on the memory; and
generate a responsive communication based on the execution of the memory operation, wherein the responsive communication includes sending a command completion code to a host, from which the received mapped block storage command originated, via a network-displaced direct storage (NDSS) layer in the host configured to provide storage commands for direct storage to the NDSS, and wherein the command completion code uses a same queue pair as an initiating PUSH command.

2. The device of claim 1, wherein the network storage circuitry is configured to execute the memory operation as part of an object storage operation.

3. The device of claim 2, wherein the network storage circuitry is configured to write a data identifier and an unstructured data block to perform the object storage operation.

4. The device of claim 1, wherein the network storage circuitry is configured to reverse the mapping to recover the primary block storage command from the mapped block storage command.

5. The device of claim 1, wherein the network storage circuitry is configured to send the primary block storage command to a non-volatile memory express (NVME) controller to determine the memory operation.

6. The device of claim 1, wherein the memory is a network-displaced direct storage (NDDS).

7. The device of claim 1, wherein the network storage circuitry is configured to handle the mapped block storage command as a storage command for a direct attached storage (DAS) device.

8. The device of claim 1, wherein the network storage circuitry is configured to de-encapsulate an RoCE command and map the de-encapsulated RoCE command to a block storage command.

9. The device of claim 1, wherein the network storage circuitry is configured to execute two-way storage communications.

10. The device of claim 1, wherein the network storage circuitry is configured to map a RoCE command to the block storage command via a RoCE to block I/O mapping queue.

11. The device of claim 10, wherein the RoCE to block I/O mapping queue is configured to perform a synchronous write operation.

12. The device of claim 1, wherein the network storage circuitry includes a network storage appliance circuitry (NSAC) stack for an object storage system, and a data identifier is used to locate unstructured data corresponding to an object through an application programming interface (API).

13. The device of claim 12, wherein the NSAC is cloud-based and a file-structure within the NSAC is hidden.

14. The device of claim 12, wherein the network storage circuitry is configured to map API commands to RoCE commands.

15. The device of claim 14, wherein the network storage circuitry is configured to RoCE terminate a command.

16. The device of claim 15, wherein the network storage circuitry is configured to process the command once terminated through an API processing layer to translate the command into a form supporting object storage.

17. A non-transitory computer readable medium having instructions that when executed by a processor implement a network storage device coupled to a memory, the device comprising:

network storage circuitry configured by the executed instructions to:
map a block command data PUSH to a remote direct memory access over converged ethernet (RoCE) SEND work queue;
send a read PUSH via the RoCE SEND work queue;
receive a mapped block storage command at a network interface;
based on a mapping between an RoCE protocol and a block storage command set, determine a primary block storage command from the mapped block storage command;
process the primary block storage command to determine a memory operation;
execute the memory operation on the memory; and
generate a responsive communication based on the execution of the memory operation, wherein the responsive communication includes sending a command completion code to a host, from which the received mapped block storage command originated, via a network-displaced direct storage (NDSS) layer in the host configured to provide storage commands for direct storage to the NDSS, and wherein the command completion code uses a same queue pair as an initiating PUSH command.

* * * * *